United States Patent
Kim et al.

(10) Patent No.: US 11,631,911 B2
(45) Date of Patent: Apr. 18, 2023

(54) GAS MEASURING APPARATUS FOR SECONDARY BATTERY

(71) Applicant: LG CHEM, LTD., Seoul (KR)

(72) Inventors: Sang Wan Kim, Daejeon (KR); Kwan Soo Lee, Daejeon (KR); Duk Hyun Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 594 days.

(21) Appl. No.: 16/625,224

(22) PCT Filed: Sep. 13, 2018

(86) PCT No.: PCT/KR2018/010745
§ 371 (c)(1),
(2) Date: Dec. 20, 2019

(87) PCT Pub. No.: WO2019/054767
PCT Pub. Date: Mar. 21, 2019

(65) Prior Publication Data
US 2020/0144681 A1  May 7, 2020

(30) Foreign Application Priority Data

Sep. 14, 2017 (KR) .................. 10-2017-0117886

(51) Int. Cl.
*G01N 25/28* (2006.01)
*G01N 7/14* (2006.01)
(Continued)

(52) U.S. Cl.
CPC .......... *H01M 10/615* (2015.04); *G01D 21/02* (2013.01); *G01N 1/24* (2013.01);
(Continued)

(58) Field of Classification Search
CPC .... H01M 50/569; H01M 6/50; H01M 6/5044; H01M 6/505; H01M 6/5055;
(Continued)

(56) References Cited

U.S. PATENT DOCUMENTS

| | | | |
|---|---|---|---|
| 6,635,379 B2 | 10/2003 | Onishi et al. | |
| 2001/0016278 A1* | 8/2001 | Onishi | H01M 10/4285 429/185 |

(Continued)

FOREIGN PATENT DOCUMENTS

| | | |
|---|---|---|
| CN | 104391074 A | 3/2015 |
| CN | 105445320 | 3/2016 |

(Continued)

OTHER PUBLICATIONS

Supplementary European Search Report issued in corresponding EP Patent Application No. 18855650.0, dated Aug. 31, 2020.
(Continued)

*Primary Examiner* — Marrit Eyassu
(74) *Attorney, Agent, or Firm* — Morgan, Lewis & Bockius LLP

(57) ABSTRACT

A gas measuring apparatus for a secondary battery comprises: a chamber accommodating a secondary battery therein; a heater unit applying heat to the chamber to ignite the secondary battery accommodated in the chamber; a collection tube connected to the inside of the chamber to collect a gas generated in the secondary battery; a vacuum unit connected to the collection tube to vacuumize the inside of the chamber so as to introduce the gas into the collection tube; and a gas measuring unit measuring an amount of gas introduced into the collection tube.

10 Claims, 8 Drawing Sheets

(51) Int. Cl.
  *H01M 10/615* (2014.01)
  *G01D 21/02* (2006.01)
  *G01N 1/24* (2006.01)
  *H01M 10/48* (2006.01)

(52) U.S. Cl.
  CPC ............... *G01N 7/14* (2013.01); *G01N 25/28* (2013.01); *H01M 10/486* (2013.01); *G01N 2001/248* (2013.01)

(58) Field of Classification Search
  CPC .. H01M 6/5061; H01M 10/48; H01M 10/482; H01M 10/484; H01M 10/486; H01M 10/488; H01M 50/50; H01M 50/502; H01M 50/543; H01M 10/615; H01M 10/42; H01M 10/4285; G01R 31/364; G01D 21/02; G01N 1/24; G01N 7/14; G01N 25/28; G01N 2001/248; G01N 1/2226; G01N 31/12; G01N 33/0027; Y02E 60/10
  USPC ............................................................ 73/1.06
  See application file for complete search history.

(56) References Cited

U.S. PATENT DOCUMENTS

| | | | |
|---|---|---|---|
| 2003/0127325 | A1 | 7/2003 | Khesin et al. |
| 2004/0138825 | A1 | 7/2004 | Kawase et al. |
| 2014/0241394 | A1 | 8/2014 | Olson |

FOREIGN PATENT DOCUMENTS

| | | | | |
|---|---|---|---|---|
| CN | 205280628 | U | | 6/2016 |
| CN | 205495304 | U | | 8/2016 |
| CN | 105954678 | A | * | 9/2016 ............... G01N 1/22 |
| CN | 105954678 | A | | 9/2016 |
| CN | 205985250 | U | * | 2/2017 |
| GB | 2044462 | A | | 10/1980 |
| JP | S48-88303 | U | | 10/1973 |
| JP | H06104007 | A | * | 4/1994 |
| JP | H07-012476 | A | | 1/1995 |
| JP | 2001-236986 | A | | 8/2001 |
| JP | 2008-039459 | A | | 2/2008 |
| JP | 4253781 | B2 | | 4/2009 |
| JP | 2010-276589 | A | | 12/2010 |
| JP | 4862542 | B2 | | 1/2012 |
| JP | 2012-138323 | A | | 7/2012 |
| KR | 10-0793367 | B1 | | 1/2008 |
| KR | 10-0832245 | B1 | | 5/2008 |
| KR | 10-2012-0050667 | A | | 5/2012 |
| KR | 10-2012-0075327 | A | | 7/2012 |
| KR | 10-2012-0111080 | A | | 10/2012 |
| KR | 10-2014-0015647 | A | | 2/2014 |
| KR | 10-2016-0066909 | A | | 6/2016 |
| KR | 10-2016-0072571 | A | | 6/2016 |
| KR | 20160066909 | A | * | 6/2016 |
| KR | 20160072571 | A | * | 6/2016 |
| KR | 10-2016-0081394 | A | | 7/2016 |
| KR | 10-1634310 | B1 | | 7/2016 |
| KR | 10-1654759 | B1 | | 9/2016 |
| KR | 10-2016-0144217 | A | | 12/2016 |
| KR | 10-1756153 | B1 | | 7/2017 |
| RU | 2091783 | C1 | | 9/1997 |

OTHER PUBLICATIONS

Extended European Search Report dated Nov. 13, 2020, issued in corresponding EP Patent Application No. 18855650.0.
International Search Report issued in corresponding International Patent Application No. PCT/KR2018/010745, dated Dec. 19, 2018.
Office Action dated Apr. 29, 2022, issued in corresponding Chinese Patent Application No. 201880039118.1 Note: KR 10-2016-0081394, KR 10-2012-0111080, JP S48-88303-U, and CN 105954678 cited therein are already of record.

* cited by examiner

GAS MEASURING APPARATUS FOR SECONDARY BATTERY

CROSS-REFERENCE TO RELATED APPLICATION

The present application claims the benefit of the priority of Korean Patent Application No. 10-2017-0117886, filed on Sep. 14, 2017, which is hereby incorporated by reference in its entirety.

TECHNICAL FIELD

The present invention relates to a gas measuring apparatus for a secondary battery.

BACKGROUND ART

Rechargeable batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

The stability of the secondary battery is important, and it is necessary to analyze an amount of gas and harmful components, which are generated when the secondary battery is ignited.

DISCLOSURE OF THE INVENTION

Technical Problem

One aspect of the present invention is to provide a gas measuring apparatus for a secondary battery, which is capable of easily collecting and analyzing an amount of gas and harmful components, which are generated when the secondary battery is ignited.

Technical Solution

A gas measuring apparatus for a secondary battery may comprise a chamber accommodating a secondary battery therein, a heater unit applying heat to the chamber to ignite the secondary battery accommodated in the chamber, a collection tube connected to the inside of the chamber to collect a gas generated in the secondary battery, a vacuum unit connected to the collection tube to vacuumize the inside of the chamber so as to introduce the gas into the collection tube, and a gas measuring unit measuring an amount of gas introduced into the collection tube.

Advantageous Effects

According to the present invention, it is possible to analyze the amount of gas and the harmful components, which are generated when the secondary battery is ignited, by igniting the secondary battery.

Also, according to the present invention, the chamber may be heated by using the heater unit to ignite the secondary battery, and the collecting tube may be connected to the chamber to collect the gas generated when the secondary battery is ignited, thereby simply and easily performing the sampling of the gas generated when the secondary battery is ignited.

Furthermore, according to the present invention, the cooling means may be provided to maintain the sealability of the chamber in which the secondary battery is accommodated. That is, the sealing member disposed on a portion at which the chamber is sealed may be cooled through the cooling means to prevent the sealing member having the O-ring shape from being damaged by heat. Thus, the sealability of the chamber may be maintained when the secondary battery is ignited, the ignited gas within the secondary battery accommodated in the chamber may be easily collected, and the harmful gas may be prevented from being discharged to the outside to improve the stability.

Also, according to the present invention, the heater unit and the chamber may be accommodated in the holder made of the heat-resistant material and the high-strength material to block the risk factors, which are generated when the secondary battery is ignited, from the outside, thereby improving the stability.

MODE FOR CARRYING OUT THE INVENTION

Figure 1:
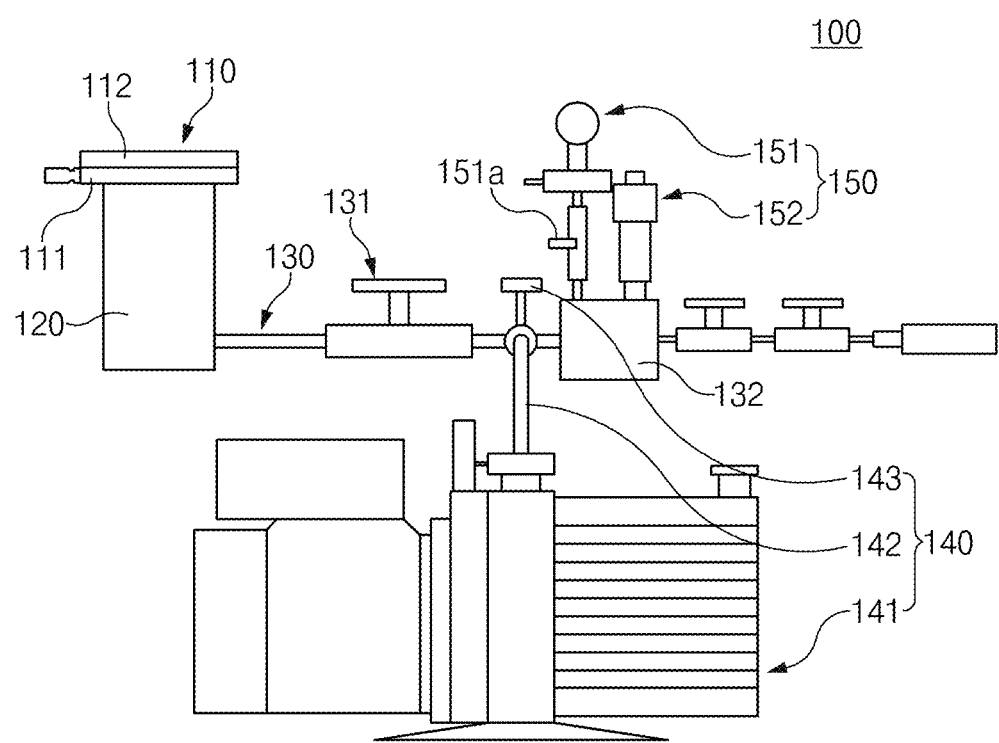
FIG. 1 is a front view of a gas measuring apparatus for a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
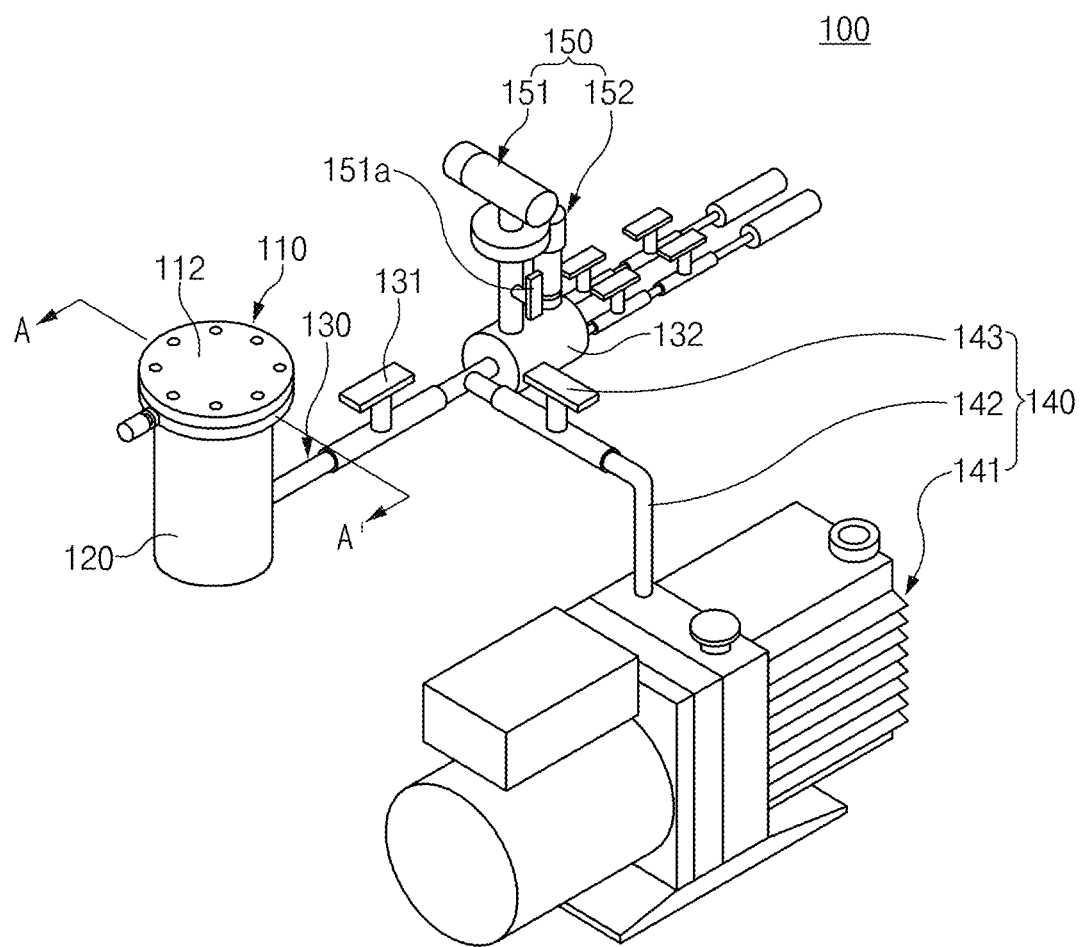
FIG. 2 is a perspective view of the gas measuring apparatus for the secondary battery according to an embodiment of the present invention.
Figure 3:
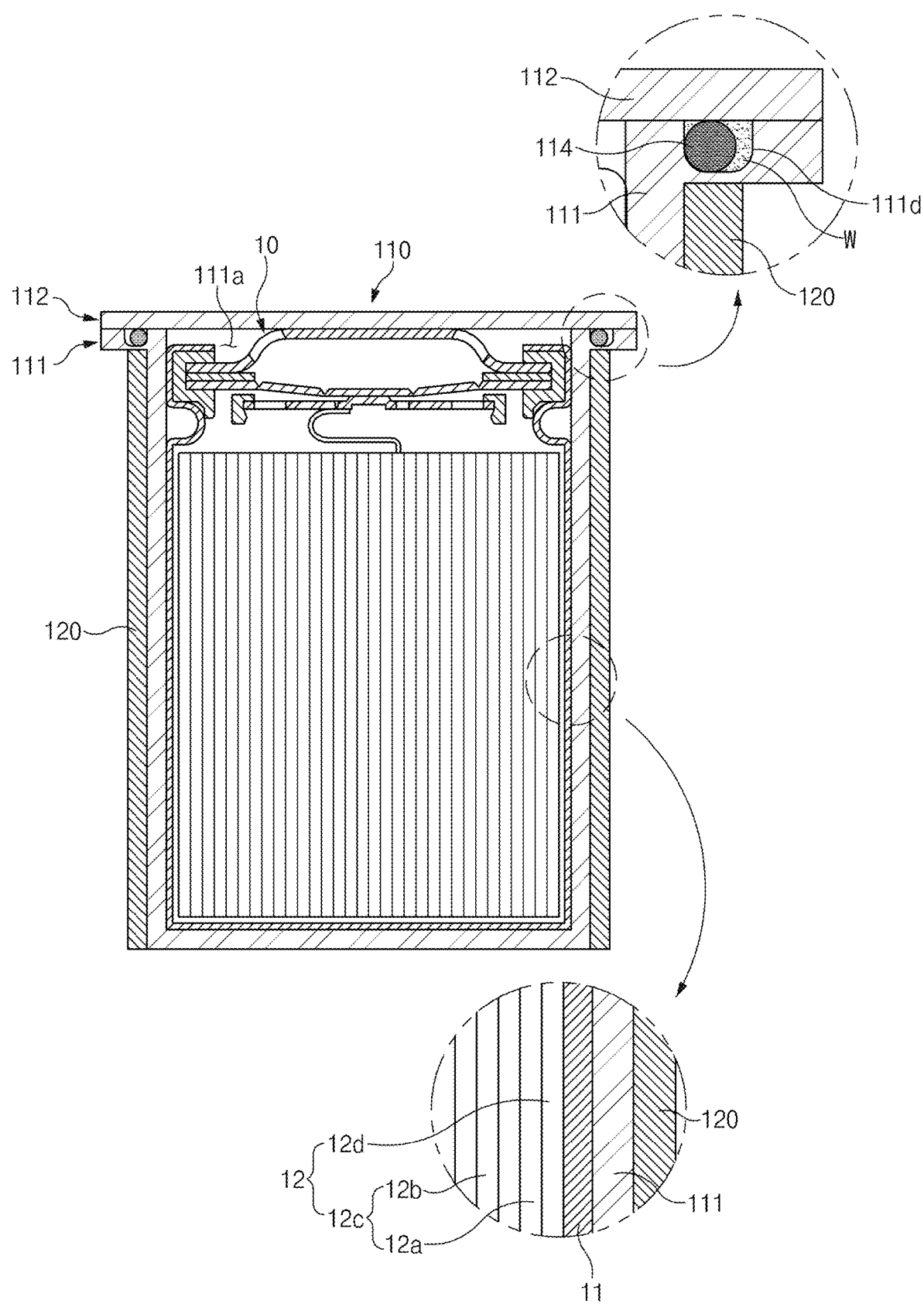
FIG. 3 is a cross-sectional view taken along line A-A' of FIG. 2.

FIG. 1 is a front view of a gas measuring apparatus for a secondary battery according to an embodiment of the present invention, FIG. 2 is a perspective view of the gas measuring apparatus for the secondary battery according to an embodiment of the present invention, and FIG. 3 is a cross-sectional view taken along line A-A' of FIG. 2.

Referring to FIGS. 1 to 3, a gas measuring apparatus 100 for a secondary battery according to an embodiment of the present invention comprises a chamber 110 accommodating the secondary battery 10, a heater unit 120 applying heat to the secondary battery 10 to ignite the secondary battery 10, a collecting tube 130 collecting a gas, a vacuum unit 140 vacuumizing the chamber 110, and a gas measuring unit 150 measuring an amount of gas.

Hereinafter, the gas measuring apparatus for the secondary battery according to an embodiment of the present invention will be described in detail with reference to FIGS. 1 to 5.

Figure 4:
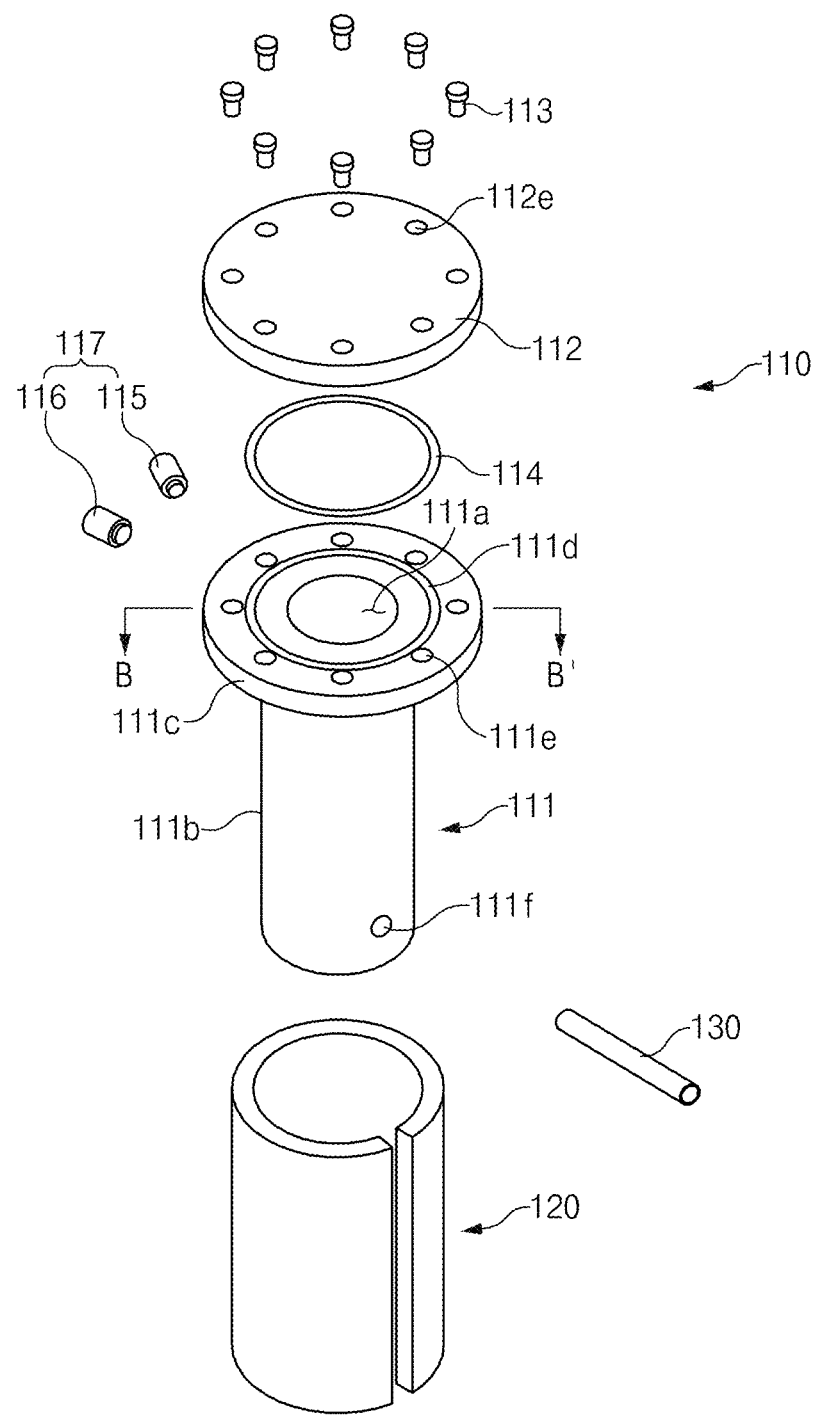
FIG. 4 is an exploded perspective view of a chamber and a heater unit in the gas measuring apparatus for the secondary battery according to an embodiment of the present invention.
Figure 5:
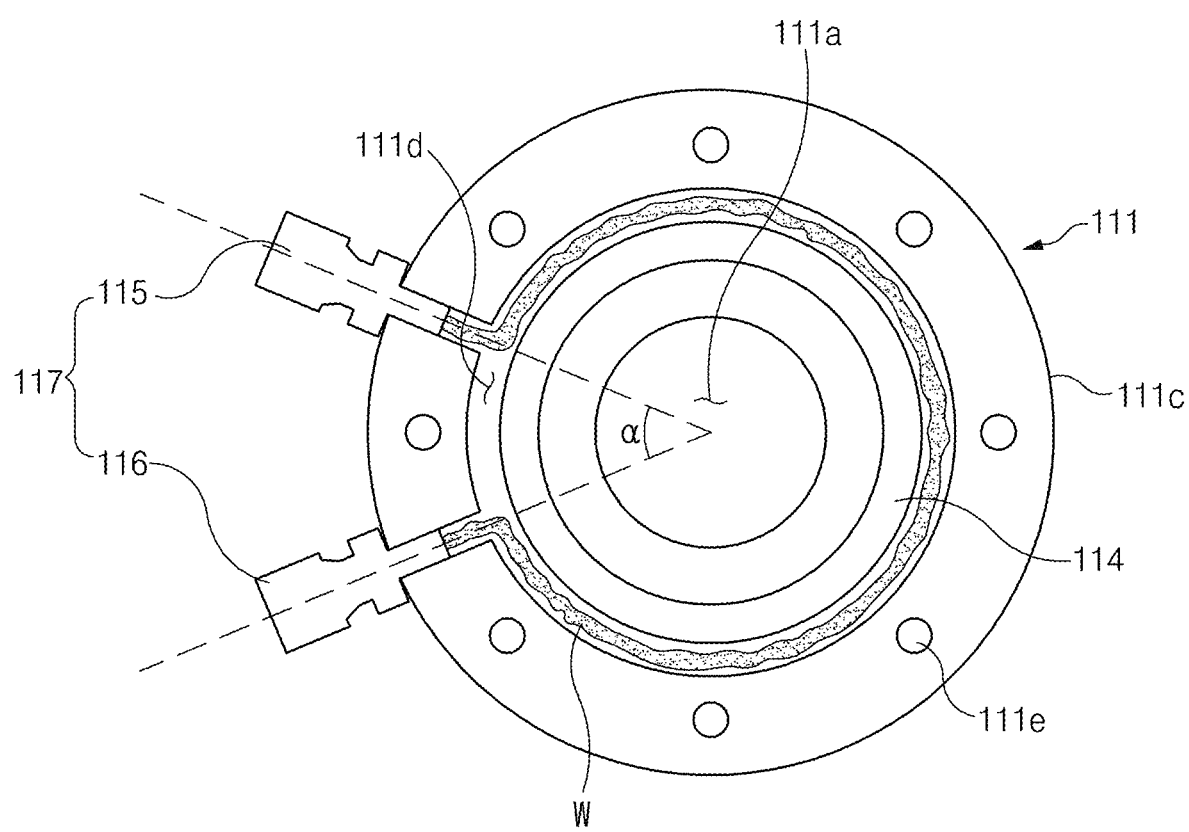
FIG. 5 is a cross-sectional view taken along line B-B' of FIG. 4.

FIG. 4 is an exploded perspective view of a chamber and a heater unit in the gas measuring apparatus for the secondary battery according to an embodiment of the present invention, and FIG. 5 is a cross-sectional view taken along line B-B' of FIG. 4.

Referring to FIGS. 3 and 4, the chamber 110 comprises an accommodation part 111a to accommodate the secondary battery 10.

For example, the secondary battery 10 may comprise a battery case 11 and an electrode assembly 12 accommodated in the battery case 11. Here, the electrode assembly 12 may be a chargeable and dischargeable power generation element and have a structure in which an electrode 12c and a separator 12d are combined and alternately stacked. The electrode 12c may comprise a positive electrode 12a and a negative electrode 12b. Also, the electrode assembly 12 may have a structure in which the positive electrode 12a/the separator 12d/the negative electrode 12b are alternately stacked.

The chamber 110 may comprise a main body 111 comprising an accommodation part 111a having one opened side to accommodate the secondary battery 10 and a cover 112 covering the one side of the main body 111 to seal the accommodation part 111a. Here, each of the main body 111 and the cover 112 may be made of, for example, stainless steel. Particularly, each of the main body 111 and the cover 112 may be made of, for example, an sus-316 material.

Furthermore, the chamber 110 may further comprise a sealing member sealing a gap between the main body 111 and the cover 112 and a cooling means cooling the sealing member 114 to prevent the sealing member 114 from being damaged by heat.

The main body 111 comprises the accommodation part 111a having the one opened side to accommodate the secondary battery 10.

Also, an accommodation groove 111d in which the sealing member 114 is accommodated may be formed in an end of the main body 111. Here, the accommodation groove 111d may be formed in a circular shape in an end surface of one side of the main body 111, which faces the cover 112.

Furthermore, the main body 111 may comprises an accommodation body accommodating the secondary battery 10 and a coupling part 111c providing a coupling portion to which the cover 112 is coupled by a coupling means 113.

The accommodation body 111b may have a cylindrical shape that is opened upward. Here, the accommodation body 111b may have an accommodation space having a cylindrical column shape that is opened upward to accommodate, for example, the cylindrical secondary battery 10. Also, a collection hole 111f passing through the collection tube 130 is formed in the accommodation body 111b so that one side of the collection tube 130 is inserted into the collection hole 111f.

The coupling part 111c may be disposed above the accommodation body 111b and have an accommodation groove 111d in a top surface thereof. Here, the accommodation groove 111d may have a circular shape larger than the accommodation space of the accommodation body 111b. Here, the accommodation groove 111d may be opened in a direction of the cover 112 and have a shape into which a circular ring is insertable.

Also, the coupling part 111c may be spaced a predetermined distance outward from the accommodation groove 111d on a plane to form a plurality of coupling holes 111e to which the coupling means 113 is coupled.

The cover 112 may cover one side of the main body 111 to seal the accommodation part 111a formed in the main body 111. Here, the cover 112 may cover a top surface of the coupling part 111c of the main body 111 to seal the accommodation space formed in the accommodation body 111b.

Also, the cover 112 may be fixed to the main body 111 through the coupling means 113. Here, the cover 112 may have a through-hole 112e to which the coupling means 113 is coupled. Here, the coupling means 113 may be provided as, for example, a screw, and a screw thread part may be formed on an inner circumferential surface of the through-hole 112e so that the screw passes to be coupled.

The sealing member 114 may be provided between the main body 111 and the cover 112 to seal a gap between the main body 111 and the cover 112.

Also, the sealing member 114 may be accommodated in the accommodation groove 111d formed in the main body 111 of the chamber 110.

Furthermore, the sealing member 114 may have a lower portion that is closely attached to a bottom surface of the accommodation groove 111d and an upper portion that is closely attached to a bottom surface of the cover 112.

Also, the sealing member 114 may be made of a flexible heat-resistant material. Here, the sealing member may have a height that is equal to or greater than that of the accommodation groove 111d. Also, the sealing member 114 may be made of, for example, a synthetic resin, synthetic plastic or synthetic rubber. Here, the sealing member 114 may be made of, for example, silicon.

The sealing member 114 may be provided as, for example, an O-ring.

Referring to FIGS. 3 to 5, a cooling means 117 may cool the sealing member 114 so that the sealing member 114 is not damaged by heat.

Also, the cooling means 117 may comprise an inlet nozzle through which coolant W is introduced into the accommodation groove 111d of the main body 111 and an outlet nozzle 116 through which the coolant W is discharged from the accommodation groove 111d. Here, the cooling means 117 may introduce the coolant W through the inlet nozzle 115, and the coolant W introduced into the accommodation groove 111d may move along the accommodation groove 111d to cool the sealing member disposed in the accommodation groove 111d and then be discharged from the accommodation groove 111d through the outlet nozzle 116.

Also, an angle α between the inlet nozzle 115 and the outlet nozzle 116, which are connected to the accommodation groove 111d, with respect to a center of a circle drawn by the accommodation groove 111d may be less than, for example 45°. Particularly, the angle α between the inlet nozzle 115 and the outlet nozzle 116 may be, for example, 5° to 45°.

Thus, when the coolant introduced through the inlet nozzle 115 moves along the accommodation groove 111d to cool the sealing member 114 and then is discharged through the outlet nozzle 116, the coolant may contact a large area of the sealing member 114 to effectively cool the sealing member 114.

The heater unit may apply heat to the chamber 110 to ignite the secondary battery 10 accommodated in the chamber 110.

Also, the heater unit 120 may have a cylindrical shape to surround an outer circumferential surface of the main body 111 of the chamber 110.

Furthermore, the heater unit 120 may comprise a heating coil to transfer resistance heat of the heating coil to the main body 111 of the chamber 110, thereby igniting the secondary battery 10.

Here, the heater unit 120 may apply heat having a temperature of, for example, about 600 degrees or more to the secondary battery 10 to ignite the secondary battery 10.

Referring to FIGS. 2 and 3, the collection tube 130 may be connected to the inside of the chamber 110 to collect a gas generated in the secondary battery 10.

Also, the collection tube 130 may further comprise a gas tank 132 providing a space for receiving the collected gas.

Furthermore, the collection tube 130 may have, for example, one side connected to the chamber 110 and the other side connected to the gas tank 132.

Also, the collection tube 130 may further comprise a collection valve 131 disposed between the chamber 110 and the gas tank 132 to open and close the collection tube 130.

The vacuum unit 140 may be connected to the collection tube 130 to vacuumize the inside of the chamber 110 so that the gas generated when the secondary battery 10 is ignited is introduced into the collection tube 130.

Also, the vacuum unit 140 may comprise a vacuum tube 142 having one side connected to the collection tube 130, a vacuum pump 141 connected to the other side of the vacuum tube 142, and a vacuum valve 143 opening and closing the vacuum tube 142. Here, the vacuum tube 142 may be connected between the chamber 110 and the gas tank 132 in the collection tube 130. Particularly, the vacuum tube 142 may be connected to a portion of the collection tube 130 disposed between the collection valve 131 of the collection tube 130 and the gas tank 132.

Furthermore, the vacuum pump may be, for example, a rotary vacuum pump and may apply a vacuum of about 200 liter/min.

The gas measuring unit 150 may measure an amount of gas introduced into the collection tube 130.

Also, the gas measuring unit 150 may comprise a pressure gauge 151 measuring an amount of generated gas and a temperature sensor 152 measuring a temperature of the gas.

The pressure gauge 151 may measure a pressure of the gas introduced into the collection tube 130. Thus, an amount of gas generated in the secondary battery 10 may be measured through the measured pressure of the gas. Here, a gauge valve 151a may be further provided between the collection tube 130 and the pressure gauge 151 to restrict opening and closing between the collection tube 130 and the pressure gauge 151.

The temperature sensor 152 may measure a temperature of the gas introduced into the collection tube 130. Here, the temperature sensor 152 may be, for example, a PT sensor.

The pressure gauge 151 may measure a pressure of the gas contained in the gas tank 132, and the temperature sensor 152 may measure a temperature of the gas contained in the gas tank 132.

Figure 6:
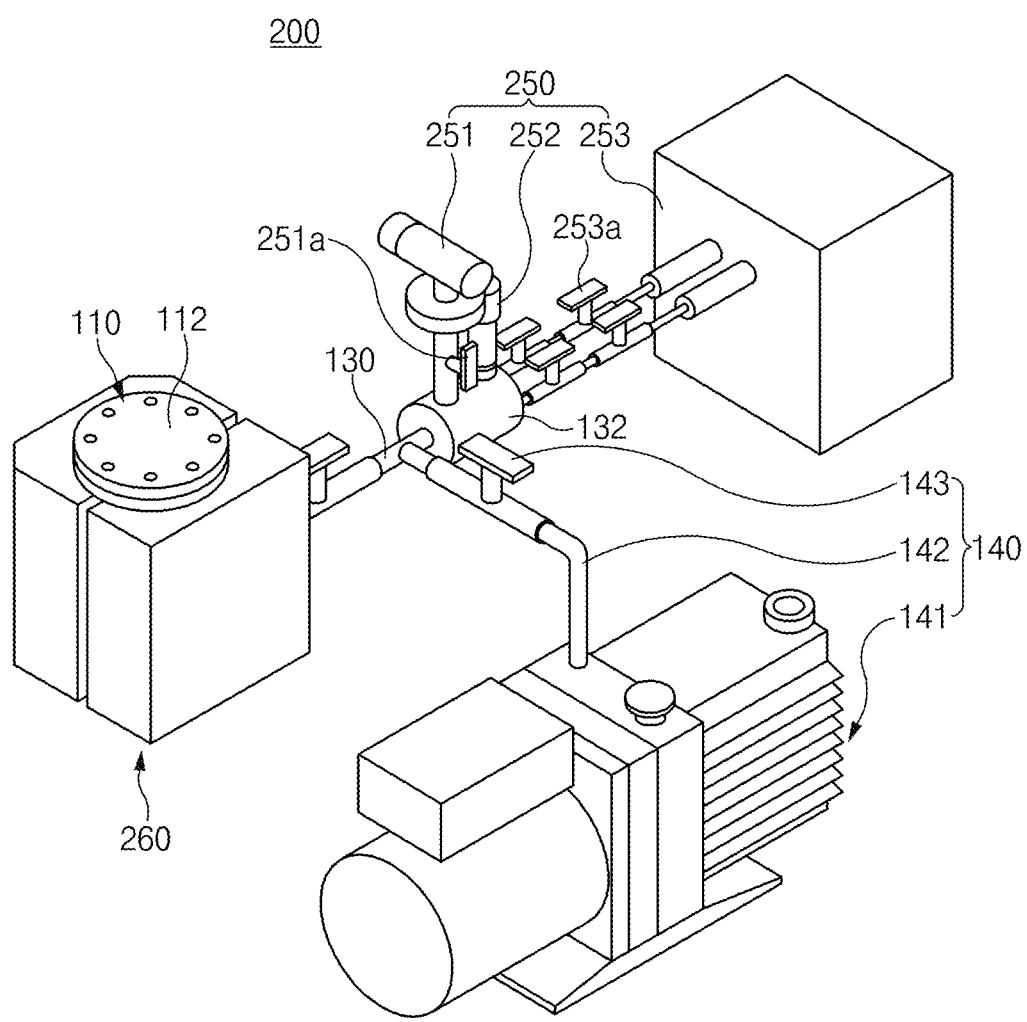
FIG. 6 is a perspective view of a gas measuring apparatus for a secondary battery according to another embodiment of the present invention.

FIG. 6 is a perspective view of a gas measuring apparatus for a secondary battery according to another embodiment of the present invention.

Referring to FIG. 6, a gas measuring apparatus 200 for a secondary battery according to another embodiment of the present invention comprises a chamber 110 accommodating the secondary battery 10, a heater unit 120 applying heat to the secondary battery 10 to ignite the secondary battery 10, a collecting tube 130 collecting a gas, a vacuum unit 140 vacuumizing the chamber 110, and a gas measuring unit 250 measuring an amount of gas. (see FIG. 3)

The gas measuring apparatus 200 for the secondary battery according to another embodiment of the present invention is different from the gas measuring apparatus 100 for the secondary battery according to the foregoing embodiment of the present invention in that the gas measuring apparatus 200 further comprises a holder 260 accommodating the heater unit 120 and the chamber 110 and a gas analysis part 253 analyzing gas components. Thus, contents of this embodiment, which are duplicated with those according to the forgoing embodiment, will be briefly described, and also, differences therebetween will be mainly described.

Figure 7:
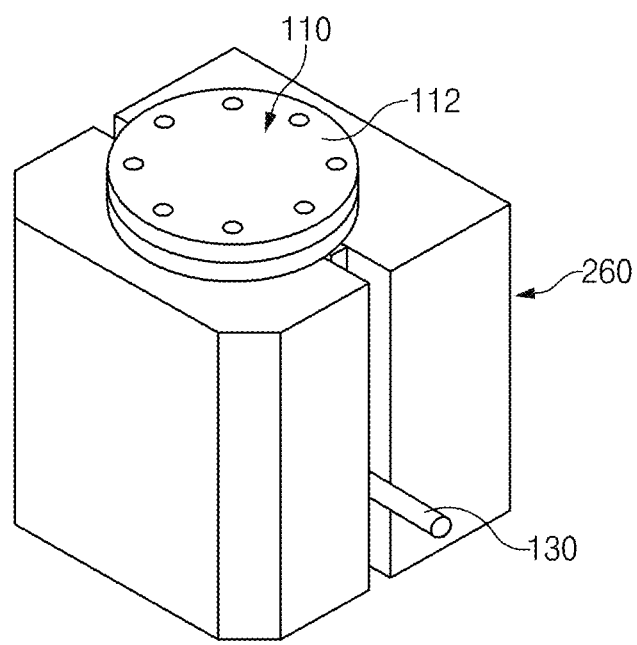
FIG. 7 is a perspective view of a holder in the gas measuring apparatus for the secondary battery according to another embodiment of the present invention.
Figure 8:
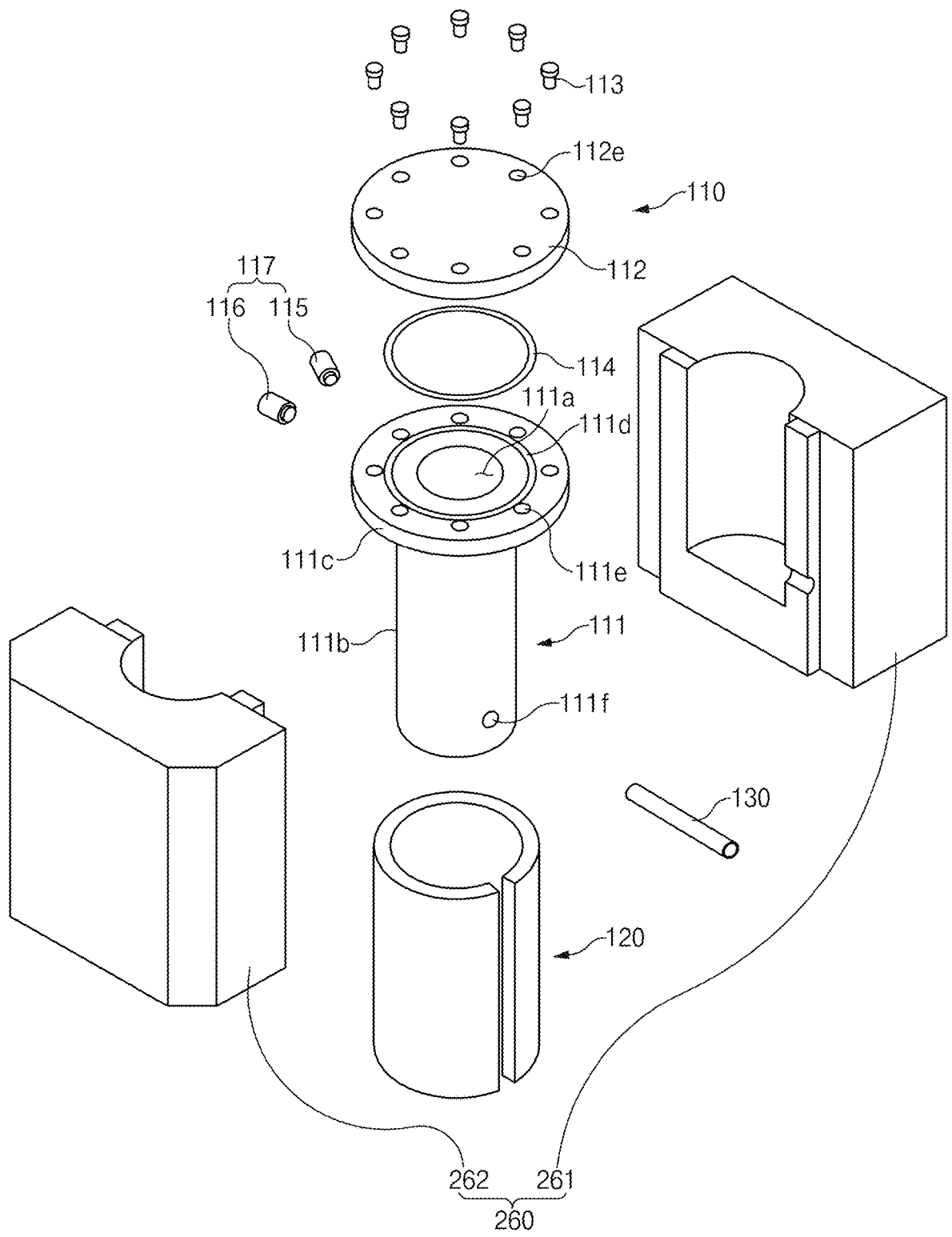
FIG. 8 is an exploded perspective view of the holder, a chamber, and a heater unit in the gas measuring apparatus for the secondary battery according to another embodiment of the present invention.

FIG. 7 is a perspective view of a holder in the gas measuring apparatus for the secondary battery according to another embodiment of the present invention, and FIG. 8 is an exploded perspective view of the holder, a chamber, and a heater unit in the gas measuring apparatus for the secondary battery according to another embodiment of the present invention.

In detail, referring to FIGS. 6 to 8, in the gas measuring apparatus 200 for the secondary battery according to another embodiment of the present invention, the holder 260 may accommodate the heater unit 120 and the chamber 110 therein to block the risk factors, which are generated when the secondary battery is ignited, from the outside.

Also, the holder 260 may comprise a first holder 261 and a second holder 262.

Furthermore, the holder 260 may comprise a heat-resistant material and a high-strength material.

In the gas measuring apparatus 200 for the secondary battery according to another embodiment of the present invention, a gas measuring unit 250 may comprise a pressure gauge 251 measuring an amount of generated gas, a gas analysis part 253 analyzing gas components, and a temperature sensor 252 measuring a temperature of the gas.

The pressure gauge 251 may measure a pressure of the gas introduced into a collection tube 130 to extract an amount of gas generated in the secondary battery. Here, a gauge valve 251a may be further provided between the collection tube 130 and the pressure gauge 251 to restrict opening and closing between the collection tube 130 and the pressure gauge 251.

The temperature sensor 252 may measure a temperature of the gas introduced into the collection tube 130. Here, the temperature sensor 252 may be, for example, a PT sensor.

The pressure gauge 251 may measure a pressure of the gas contained in a gas tank 132 of a collection tube 130, and the temperature sensor 252 may measure a temperature of the gas contained in the gas tank 132.

The gas analysis part 253 may analyze components of the gas introduced into the collection tube 130 to analyze whether the gas contains harmful components to analyze the harmful components. Here, the gas analysis part 253 may comprise, for example, a gas chromatography.

Also, the gas analysis part 253 may be connected to the gas tank 132 of the collection tube 130 to analyze components of the gas contained in the gas tank 132. Here, a restriction valve 253*a* may be provided between the gas analysis part 253 and the gas tank 132 to restrict opening and closing between the gas tank 132 and the gas analysis part 253.

While the present invention has been particularly shown and described with reference to exemplary embodiments thereof, it is to be understood that the scope of the present invention is not limited to the gas measuring apparatus for the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A gas measuring apparatus for a secondary battery, the gas measuring apparatus comprising:
   a chamber a configured to accommodate the secondary battery therein;
   a heater unit configured to apply heat to the chamber to ignite the secondary battery accommodated in the chamber;
   a collection tube connected to the inside of the chamber to collect a gas generated in the secondary battery;
   a vacuum unit connected to the collection tube to vacuumize the inside of the chamber so as to introduce the gas into the collection tube; and
   a gas measuring unit configured to measure an amount of gas introduced into the collection tube
   wherein the chamber includes:
      a main body comprising an accommodation part having an opened one side to accommodate the secondary battery and an end in which an accommodation groove is defined around the opened one side;
      a cover covering the opened one side of the main body to seal the accommodation part;
      a sealing member accommodated in the accommodation groove to be between the main body and the cover to seal a gap between the main body and the cover, the sealing member having a height that is equal to or greater than a height of the accommodation groove;
      an inlet nozzle through which coolant is configured to be introduced into the accommodation groove; and
      an outlet nozzle through which the coolant is configured discharged from the accommodation groove, and
   wherein a flow of the coolant through the accommodation groove from the inlet nozzle around the opened one side to the outlet nozzle is configured to cool the sealing member to prevent damage of the sealing member by heat.

2. The gas measuring apparatus of claim 1, wherein the heater unit comprises a heating coil, wherein the heater unit has a cylindrical shape to surround an outer circumferential surface of the main body of the chamber, and wherein the heater unit is configured to transfer resistance heat of the heating coil to the main body of the chamber so as to ignite the secondary battery.

3. The gas measuring apparatus of claim 1, wherein the accommodation groove is opened in a direction of the cover and has a shape into which a circular ring is insertable, and
   the sealing member comprises an O-ring.

4. The gas measuring apparatus of claim 3, wherein an angle between the inlet nozzle and the outlet nozzle, which are connected to the accommodation groove, with respect to a center of a circle drawn by the accommodation groove is less than 45°.

5. The gas measuring apparatus of claim 1, further comprising a holder made of a heat-resistant material and accommodating the heater unit and the chamber therein to block risk factors, which are generated when the secondary battery is ignited, from the outside.

6. The gas measuring apparatus of claim 1, wherein the vacuum unit comprises:
   a vacuum tube having one side connected to the collection tube;
   a vacuum pump connected to the other side of the vacuum tube; and
   a vacuum valve configured to open and close the vacuum tube.

7. The gas measuring apparatus of claim 1, wherein the gas measuring unit comprises a gauge configured to measure a pressure of the gas introduced into the collection tube to measure an amount of generated gas.

8. The gas measuring apparatus of claim 7, wherein the gas measuring unit further comprises a temperature sensor configured to measure a temperature of the gas introduced into the collection tube.

9. The gas measuring apparatus of claim 8, wherein the collection tube further comprises a gas tank configured to provide a space in which the gas is contained, and
   wherein the gauge is configured to measure a pressure of the gas contained in the gas tank, and the temperature sensor is configured to measure a temperature of the gas contained in the gas tank.

10. The gas measuring apparatus of claim 1, wherein the gas measuring unit comprises a gas analysis part analyzing components of the gas introduced into the collection tube.

* * * * *